United States Patent [19]

Liu et al.

[11] Patent Number: 5,066,434

[45] Date of Patent: Nov. 19, 1991

[54] METHOD OF FORMING A MULTILAYER HEAT SEALABLE FILM

[75] Inventors: Leland L. Liu, Macedon; Patricia A. Cyr, Farmington, both of N.Y.

[73] Assignee: Mobil Oil Corporation, Fairfax, Va.

[21] Appl. No.: 559,868

[22] Filed: Jul. 27, 1990

Related U.S. Application Data

[62] Division of Ser. No. 208,307, Jun. 16, 1988, Pat. No. 4,944,990.

[51] Int. Cl.⁵ .............. B05D 7/04; B29C 39/20; B29C 47/06; B32B 31/30
[52] U.S. Cl. ...................... 264/37; 264/41; 264/129; 264/171; 264/210.3; 264/290.2; 427/209; 427/302; 427/386; 427/388.4; 427/393.5
[58] Field of Search ............ 264/22, 80, 83, 129, 264/134, 171, 210.1, 210.3, 210.4, 211, 211.12, 211.13, 211.18, 289.6, 290.2, 37, 41; 427/40, 41, 209, 211, 223, 248.1, 255.6, 302, 386, 388.4, 393.5

[56] References Cited

U.S. PATENT DOCUMENTS

| | | | |
|---|---|---|---|
| 4,377,616 | 3/1983 | Ashcraft et al. | 428/213 |
| 4,439,493 | 3/1984 | Hein et al. | 428/414 |
| 4,447,494 | 5/1984 | Wagner, Jr. et al. | 428/349 |
| 4,495,027 | 1/1985 | Wagner, Jr. et al. | 156/244.11 |
| 4,564,558 | 1/1986 | Touhsaent et al. | 428/349 |
| 4,565,739 | 1/1986 | Clauson et al. | 428/349 |
| 4,681,803 | 7/1987 | Liu | 428/348 |

FOREIGN PATENT DOCUMENTS 1134876 11/1968 United Kingdom .
1174328 12/1969 United Kingdom .

*Primary Examiner*—Leo B. Tentoni
*Attorney, Agent, or Firm*—Alexander J. McKillop; Charles J. Speciale

[57] ABSTRACT

A method for producing a heat sealable structure includes coextruding a substrate layer including a white opaque, cavitated polyolefin film with a second layer which includes a heat sealable ethylene propylene random copolymer, ethylene-propylene block copolymer or ethylene-propylene butene-1 terpolymer; biaxially orienting the coextrudate; treating to increase surface energy; applying a primer coating on the surface; and, applying a surface layer which includes vinylidene chloride copolymer.

6 Claims, No Drawings

METHOD OF FORMING A MULTILAYER HEAT SEALABLE FILM

This is a division of copending application Ser. No. 208,307, filed on June 16, 1988, now U.S. Pat. No. 4,944,990.

BACKGROUND OF THE INVENTION

The present invention relates generally to a multilayer film and, more particularly, to a flexible multilayer heat sealable film especially suited for packaging and to a method of forming the same.

In the packaging of certain types of foods, such as, for instance, snack foods like corn-based products, potato chips, cookies and the like, it is common practice to employ a multilayer film having two or more polymeric layers wherein one of the layers is known to be an effective heat seal layer. In the packaging process, a supply of such a multilayer film can be shaped into a tube in a vertical form and fill machine. Marginal regions of the heat seal layer are brought in face-to-face relationship and heat sealed together. Thereafter, the packaging machine automatically forms a hot seal and makes a horizontal severance across the bottom of the bag; product is dispensed into the open end of the tube and, thereafter, a second horizontal heat seal is effected across the tube with a simultaneous severing through the tube to provide a product packaged in a tube, heat sealed at both ends, and along one seam at right angles to the sealed ends. While the food or other product is being dispensed into the package, air also is present in the package and this air assists in protecting and cushioning the product during subsequent shipment of the finished packages. During shipment of the product, particularly with the larger sized bags, e.g., those containing 16 ounces of product, the bags have a tendency to split or burst at the end seals.

A multilayered wrapping film of the type having the above mentioned utility is described in U. S. Pat. No. 4,214,039, the subject matter of which is, in its entirety, incorporated by reference herein. This patent describes a packaging film structure comprising a polypropylene film substrate having a heat sealable vinylidene chloride polymer containing at least 50% by weight of vinylidene chloride. Intermediate the polypropylene film and the vinylidene chloride polymer is a primer coat which consists of the reaction product of an acidified aminoethylated vinyl polymer of an epoxy resin. This primer coat significantly enhances the bond strength between the polypropylene and the heat sealable vinylidene chloride polymer. While this packaging material is effective for the packaging of comparatively small quantities of product, there is a need to increase its seal strength when used for the packaging of comparatively large quantities of product.

There are several known packaging products which have been developed to satisfy the requirement of increased seal strength for the packaging of comparatively large quantities of products.

U.S. Pat. No. 4,565,739 describes an oriented heat sealable multi-layer structure including a polyolefin film substrate. A second layer, positioned on at least one surface or the film substrate, includes a member selected from the group consisting of a medium density polyethylene, a high density polyethylene and mixtures thereof and polypropylene. A primer coating is positioned on at least one surface of the second layer and, finally, a heat sealable layer is positioned on the primer coating. The heat sealable layer includes a member of the group consisting of an acrylic polymer layer and a vinylidene chloride polymer layer.

U.S. patent application Ser. No. 099,247, filed Sept. 21, 1987 now U.S. Pat. No. 4,865,908 and having the same assignee as herein describes a coated, oriented polymer film laminate comprising:

a) an oriented core layer having an upper face and a lower face, said core layer being fabricated from a polypropylene homopolymer;

b) an oriented layer applied to the lower face, and optionally, to the upper face, of core layer (a), said layer being fabricated from a member of the group consisting of copolymer or blend of copolymers, homopolymer or blend of homopolymers, a blend of at least one copolymer and at least one homopolymer, terpolymer or blend of terpolymers, and a blend of at least one terpolymer and at least one homopolymer or at least one copolymer;

c) a coating layer to the upper face of core layer (a), or, where layer (b) has been applied thereto, to the exposed surface of said layer (b), and;

d) an adhesively bonded substrate or a coating composition applied directly to the exposed surface of layer (b) applied to the lower face of core layer (a).

U.S. Pat. No. 4,564,558 describes an oriented multilayer heat sealable film structure including (a) a polyolefin film substrate; (b) a layer, consisting essentially of a terpolymer of propylene with ethylene and 1-butene, positioned on at least one surface of substrate (a); (c) a primer coating on at least one surface of layer (b); and (d) a heat sealable layer on primer coating (c). The heat sealable layer (d) includes a member of the group consisting of an acrylic polymer and a vinylidene chloride polymer layer.

U.S. Pat. Nos. 4,495,027 and 4,447,494 describe an oriented multi-layer heat sealable packaging film structure which includes (a) a polyolefin film substrate; (b) a coextruded layer, positioned on at least one surface of substrate (a), consisting essentially of a random copolymer of ethylene and propylene; (c) a primer coating on at least one surface of coextruded layer (b); and (d) a heat sealable layer on primer coating (c) including a vinylidene chloride copolymer containing at least 50% by weight of vinylidene chloride.

U.S. Pat. No. 4,439,493 describes a multi-layer heat sealable oriented packaging film including (a) a polyolefin film substrate; (b) a layer on at least one surface of substrate (a) consisting essentially of a random copolymer of ethylene and propylene containing from about 0.5 to about 6% by weight of ethylene; (c) a primer coating on at least one surface of layer (b); and (d) a heat sealable layer on primer coating (c) including an interpolymer of (i) a minor amount by weight of acrylic acid, methacrylic acid or mixtures thereof and (ii) a major amount of neutral monomer esters including methyl acrylate or ethyl acrylate and methyl methacrylate.

In addition to the desirability of adequate heat seals to prevent splitting or bursting, packaging material ideally requires a pleasing appearance and a good barrier to moisture and gases.

U.S. Pat. No. 4,377,616 discloses an opaque, biaxially oriented polymeric film structure comprising a thermoplastic core matrix having a strata of voids; said voids being created by the inclusion within the matrix material of spherical void-initiating solid particles which are incompatible with the matrix material. The void space occupied by the particle is substantially less than the volume of the void. The polymer matrix material is extruded in the form of a film and positioned on opposite surfaces of the film are void free, transparent thermoplastic skin layers adhering to said surface. The voids present in this structure cause light diffraction resulting in an opalescent appearance.

While some of these patents may satisfy the requirement of increased seal strength for the packaging of large quantities of product or provide for an opaque appearance, none of them enjoy the benefits of a cavitated, white opaque multi-layer film structure, stronger heat seal capabilities, and improved liquid and gas barrier properties.

SUMMARY OF THE INVENTION

In accordance with the present invention, an oriented multi-layer heat sealable structure is provided which includes:

(a) a substrate including a white opaque polyolefin film;

(b) a second layer coextruded on at least one surface of the substrate (a), the second layer including a heat sealable polyethylene, copolymer, terpolymer or blends thereof;

(c) optionally, a third layer coextruded on the other surface of substrate (a), the third layer being either identical to or different from layer (b);

(d) a primer coating on at least one surface of the second layer (b); and (e) a heat sealable layer on the coating (d), the heat sealable layer including a vinylidene chloride copolymer containing at least 50% by weight of vinylidene chloride.

The method for producing the multi-layer heat sealable structure of the present invention comprises:

(a) coextruding a substrate layer including a white opaque polyolefin film with a second layer including a heat sealable homopolymer, copolymer, terpolymer or blends thereof;

(b) biaxially orienting the colayered product of step (a);

(c) treating a surface of the second layer to increase surface energy;

(d) applying a primer coating on the surface of the second layer; and (e) applying a heat sealable layer on the primer coating, said heat sealable layer including a vinylidene chloride copolymer containing at least 50% by weight of vinylidene chloride.

The inventive structure of this multi-layer heat sealable structure presents many highly desirable characteristics. The enhanced sealability is especially effective for the packaging of comparatively large quantities of product since there has been a tendency for such packages to split or burst at the end seams. At the same time, this packaging material is effective for the packaging of comparatively small quantities of product.

In addition, the second layer provides excellent wet-out to water based inks and coatings and higher bond strength between that layer and a substrate. Furthermore, the white opaque film presents an attractive appearance while providing low light transmission, low water vapor transmission rate and low oxygen transmission rate since the cavitation included therein provides no path through which light, liquid or oxygen can traverse. Thus it is apparent that this invention provides a unique and unexpected combination of advantages in packaging technology.

DESCRIPTION OF THE PREFERRED EMBODIMENTS

The polyolefins contemplated as the substrate or core material of the subject film structure include polyethylene, polypropylene, polybutene and copolymers and blends thereof. Particularly preferred is an isotactic polypropylene containing at least about 80% by weight of isotactic polypropylene. It is also preferred that the polypropylene have a melt flow index of from about 4 to 8/g/10 minutes. The polyolefin substrate or core layer (a) of the present invention is opaque. Opacity can be imparted to the substrate layer in any known manner. For instance, as merely illustrative, the polyolefin substrate can become opacified in the manner described in U.S. Pat. No. 4,377,616.

In addition, the polyolefin substrate or core of the present invention is white. The whiteness can be imparted to the substrate layer in any known manner.

For example, the white opaque polyolefin substrate or core can be made by mixing a major proportion of polyolefin with a second material of higher melting point and which is in the form of microspheres. The mixture is heated to melt the polyolefin and the microspheres are dispersed throughout the molten material. The mixture is then extruded in a core layer and the layer is biaxially oriented to create cavitation in the layer. In addition, 1 to 3% $TiO_2$ can be added to impart a further degree of whiteness.

In a most preferred embodiment, the white opaque polyolefin substrate is cavitated.

The homopolymers, copolymers, terpolymers or blends contemplated herein as the layer (b) coextruded with the base polyolefin (a), in some way not completely understood, functions to increase the overall bond strength formed in ESM seals or crimp seals when employing vinylidene chloride polymer heat seals.

The homopolymer contemplated herein is formed by polymerizing the respective monomer. This can be accomplished by bulk or solution.

The copolymer contemplated herein can be selected from those copolymers typically employed in the manufacture of multilayered films. For instance, an ethylene propylene random copolymer which is formed by the simultaneous polymerization of the respective monomers can be used to form layer (b). Effective formation of a random copolymer of ethylene and propylene is accomplished when the ethylene is present simultaneously with the propylene in the amount sufficient to result in from about 0.5 to about 10% by weight of ethylene in the resulting copolymer. This system is characterized by random placement of the respective monomer units along the polymer chain. This is in contrast with a block copolymer of ethylene and propylene formed by sequential polymerization of the respective monomers. The feeding of the monomers in forming a block copolymer is controlled so that the monomer employed in one stage of the sequential polymerization is not added until the monomer employed in the preceding stage has been at least substantially consumed thereby insuring that the concentration of the monomer remaining from that preceding stage is sufficiently low to prevent formation of an excessive proportion of random copolymer.

The contemplated terpolymers are comparatively low stereoregular polymers. The terpolymers can have a melt flow rate at 446° F. ranging from about 2 to about 10 grams per 10 minutes and preferably from about 4 to about 6 grams per 10 minutes. The crystalline melting point can range from about less that 250° F. to somewhat greater than 271° F. The terpolymers will predominate in propylene, and the ethylene and 1-butene monomers can be present in approximately from 0.3:1–1:1 mole percentage in relation to each other.

The preferred base substrate layer can be homopolypropylene having a melting point range of from about 321° F. to about 336° F. A commercially available material of this description is FINA W828. For the coextruded skin layers, preferred terpolymers, such as, ethylene-propylene-butene terpolymers, would have melting points of about 266° F. and 255° F., respectively. The materials are commercially available as Chisso XF 7500 and Chisso XF 7700. These terpolymers contain from about 1 to about 7 wt.% ethylene and from about 1 to about 7 wt.% 1-butene.

In preparing the multi-layer structure of the present invention, the substrate layer (a) and layer (b) are coextruded so that layer (b) is from about 2 to about 25% of the total thickness of the two layers. For some purposes, layer (b) can be on both surfaces of a core layer of polypropylene (a) in which both layers (b) would amount to from about 4 to about 50% of the total thickness of the three layers. In preparing the coextruded film it has been found advantageous and convenient to recycle certain quantities of scrap extrudate back into the base homopolymer polypropylene or other polyolefin. Thus, the homopolymer polypropylene or other polyolefin can have from about 0 to about 30% of reclaimed material interblended therein.

It has been found that heat seal layers, such as vinylidene chloride copolymer heat seal layers, do not adhere well to polyolefin film surfaces, especially polypropylene film surfaces, even when the latter have been subjected to well known pretreatment operations such as, for example, treatment by corona discharge, flame or oxidizing chemicals. The same has been found to be true in adhering the heat seal layers contemplated herein to the surface of layer (b). However, it has been found that the use of primers intermediate between layer (b) and the heat seal layer provides an unexpectedly high level of adherence.

The primer materials contemplated for enhancing the bond between layer (b) and the vinylidene chloride copolymer heat seal layer (d) include the reaction product of an epoxy resin and an acidified aminoethylated vinyl polymer. The contemplated epoxy resins are glycidyl ethers of polyhydroxy compounds. Typical polyhydroxy compounds which may be used include bisphenol A, ring substituted bisphenol A, resorcinal, hydroquinone, phenol-formaldehyde, novolac resins, aliphatic diols, such as ethylene glycol, propylene glycol, 1,4-butanediol, 1,6-hexanediol, glycerol, lower alkyl hydantoins and mixtures thereof.

The preferred epoxy resins of the present invention are those made by the glycidation reaction between epichlorohydrin and bisphenol A. Epoxy resins of this type are commonly classified by their epoxy equivalent weight (EEW) which is defined as the weight of resin in grams which contains one gram equivalent of epoxy groups. Resins with an EEW ranging from about 170 to about 280 may be used in the present invention, but the preferred range is from about 180 to about 210.

A variation in the composition of the epoxy resin component is one in which a hydantoin compound is substituted for the bisphenol A. For example, 1,1-dimetyhl hydantoin may be employed in a low molecular weight epoxy resin since resins based on this material are completely water soluble thereby eliminating the necessity for emulsification.

Although the specific structure of the epoxy resin is not critical to the primer employed in the present invention, important considerations in the selection of the epoxy resin depend upon its physical state. For example, it must be liquid and capable of being readily dispersed or dissolved with the second component or curing agent as described hereinbelow. If the epoxy resin is of low viscosity, it may be stirred directly into the second component, i.e., curing agent, however, it is preferred to employ the epoxy resin in an aqueous emulsion.

The second component in the epoxy primer compositions of the present invention is an amino modified acrylic polymer which is water soluble. This polymer is a curing agent for the epoxy compound. The preferred material is described in the U.S. Pat. No. 3,719,629, the disclosure of which is incorporated herein by reference, and may be generically described as an acidified aminoethylated interpolymer having pendant aminoalkylate groups. This material is produce by polymerizing acrylate, methacrylate, styrene or other suitable monomers with sufficient methacrylic or acrylic acid to give a -COOH content of about 7.5 to about 12.5%. Solvent polymerization techniques are preferred. The polymer is then reacted with ethyleneimene monomer and acidified with hydrochloric acid to render the polymer water soluble.

The primer coating may be applied to the layer (b) as a dispersion or as a solution, from an organic vehicle, for example, an alcohol or an aromatic hydrocarbon, such as xylene or a mixture thereof.

In one embodiment of the present invention, a liquid epoxy resin is emulsified in a solution of the curing agent by rapid stirring. Thereafter, the resultant dispersion is diluted with water to the desired concentration for coating, which typically includes from about 2 to about 25% solids.

When mixing the epoxy resin with the curing agent, it is generally preferred to use a stoichiometric equivalent balance of epoxy and amine groups. However, it has been found that the stoichiometric ratio may be varied over a wide range, for instance, from about one epoxy group to about three amine groups through three epoxy groups to one amine group and, preferably, from about one epoxy group to two amine groups through about two epoxy groups to about one amine group, without seriously affecting the product's usefulness as a primer coating.

It is to be understood that the solution or dispersion of epoxy resin and curing agent can contain small amount of wetting agents in order to facilitate the application of the primer material to the surface of layer (b). Conventional nonionic wetting agents which can be employed include the hexyl or benzyl ether of ethylene glycol, the hexyl ether of diethylene glycol, butyl alcohol, hexyl alcohol, octyl alcohol, diacetone alcohol, and the like.

Although mixtures of the epoxy resin and the curing agents will cross-link or cure without the necessary addition of a catalyst, it has been found advantageous in certain instances to use an amine catalyst. Such catalysts include propylene diamine, hexamethylene diamine, etc.

It is to be understood that the present multi-layer structure is not limited to the specific class of primer compositions defined hereinabove. Other operable primer compositions include those defined in U.K. Patent No. 1,134,876 which discloses a primer produced by condensing a monoaldehyde with an interpolymer of acrylamide or methacrylamide and at least one other unsaturated monomer. U.K. Patent No. 1,174,328 discloses a material which has utility as a primer in the present invention. The material described is the product resulting from condensing aminoaldehyde with acrylamide or methacrylamide and, subsequently, interpolymerizing the condensation product with at least one other unsaturated monomer in the presence of a $C_1$-$C_6$ alkanol.

A preferred primer coating resin of this type comprises a copolymer containing up to 90% by weight of styrene, up to 80% by weight of an alkyl acrylate, up to 15% by weight of methacrylic acid and from about 5% to about 25% by weight of acrylamide, which has been condensed with a solution of formaldehyde in n-butanol containing from about 0.2 to about 3 equivalents of formaldehyde for each amide group in the copolymer. A particularly preferred primer resin is a 50% solids solution of a copolymer resin containing 38.5 parts of styrene, 44 parts of ethyl acrylate, 2.5 parts of methacrylic acid and 15 parts of acrylamide, which has been condensed with 5.2 parts of formaldehyde in n-butanol.

The composition of the vinylidene chloride polymer latex which is employed as the heat sealable top coating material layer (d) on the primer layer (c), is not critical to the practice of the invention. Commercially available vinylidene chloride latexes having a vinylidene chloride content of at least 50% and, preferably, from about 75% to about 92% may be employed. The other ethylenically unsaturated comonomers may include alpha, beta ethylenically unsaturated acids, such as acrylic and methacrylic acids; alkyl esters containing 1-18 carbon atoms of said acids, such as methylmethacrylate, ethyl acrylate, butyl acrylate, etc. In addition, alpha, beta ethylenically unsaturated nitriles, such as acrylonitrile and methacrylonitrile can be employed, as well as monovinyl aromatic compounds, such as styrene and vinyl chloride.

Specific vinylidene chloride polymer latexes contemplated include 82% by weight vinylidene chloride, 14% by weight ethyl acrylate and 4% by weight acrylic acid. Alternatively, a polymer latex comprising about 80% by weight vinylidene chloride, about 17% by weight methyl acrylate and about 3% by weight methacrylic acid can likewise be employed. In addition, the heat seal composition described in the U.S. Pat. No. 4,058,649, the disclosure of which is entirely incorporated herein by reference, can be employed.

The multi-layer structure of the present invention can have an overall thickness within a wide range but is preferably from about 0.5 up to about 3.0 mils in thickness.

Before applying the primer coating composition to the second layer, the exposed surface of layer (b) is treated to increase its surface energy and therefore insure that the coating layer (c) will be strongly adherent thereto thereby eliminating the possibility of the coating peeling or being stripped from the film laminate. This treatment can be accomplished employing known techniques such as, for example, film chlorination, i.e., exposure of the film surface to gaseous chlorine, treatment with oxidizing agents such as chromic acid, hot air or steam treatment, flame treatment and the like. Although any one of these techniques is effectively employed to pretreat the film surface, a particularly desirable method of treatment is the so called electronic treatment method which comprises exposing the film surface to a high voltage corona discharge while passing the film between a pair of spaced electrodes. After electronic treatment of the film surface, the coating composition is then applied thereto.

The primer dispersion, to be applied to the surface of layer (b) can have a solids concentration of from about 5% up to about 25%.

The primer dispersion can be applied to the surface of layer (b) utilizing standard coating techniques so that a dry coating weight of from about 0.05 up to about 0.25 gram/1,000 square inches of film is obtained. The thus coated film can be subsequently passed through a hot air oven to completely remove water and solvent. Thereafter, this primer coated film can be coated with the selected vinylidene chloride polymer latex also using standard coating techniques such as graveur, roll coating, and the like. The vinylidene chloride polymer coated system can then be dried by passing it through a conventional hot air oven.

The amount of vinylidene chloride polymer applied to the multi-layer film may be varied over a wide range depending upon the specific properties desired in the final film product. Coating weights of from about 1 to about 6 grams per 1,000 square inches may be employed. If a two-sided coated film is desired, the beneficial corona treating of the substrate coated with layer (b) the priming and the vinylidene chloride polymer application can be repeated, either in line or out-of-line.

EXAMPLE

Known and conventional coextrusion and orientation techniques were employed in preparing a number of PVDC coated, oriented polymer films within the scope of this invention and, for comparison purposes, PVDC coated, oriented polymer films outside the scope of the invention.

The PVDC coated white opaque films were tested for crimp seal strength. The type of polymer used in the skin layer and the percent of the core layer that the polymer represented were varied. Crimp seals were tested skin to skin and the force needed to separate the seals was determined.

The results are shown in the table below. It is clear from the table that samples containing PVDC coated white opaque films with ethylene propylene random copolymer, ethylene-propylene block copolymer and ethylene-propylene butene-1 terpolymer had heat seal strengths significantly greater than the control. In fact, the strength of the seal in the film with ethylene propylene radom copolymer present at 15% of the core layer was outstanding. At the same time, the PVDC coated white opaque films presented unusually good appearance characteristics.

TABLE

| FILM SEALABILITY | | |
|---|---|---|
| SKIN RESIN WITH PVDC COATING | SKIN % | CRIMP SEAL @ 260° F. (g/in) |
| ETHYLENE PROPYLENE RANDOM COPOLYMER | 5 | 855 |
| ETHYLENE PROPYLENE RANDOM COPOLYMER | 15 | 1185 |
| ETHYLENE PROPYLENE BLOCK COPOLYMER | 5 | 548 |

TABLE-continued
FILM SEALABILITY

| SKIN RESIN WITH PVDC COATING | SKIN % | CRIMP SEAL @ 260° F. (g/in) |
|---|---|---|
| ETHYLENE-PROPYLENE-BUTENE-1 TERPOLYMER | 5 | 875 |
| POLYPROPYLENE HOMOPOLYMER (CONTROL) | 5 | 360 |
| POLYPROPYLENE HOMOPOLYMER (CONTROL) | 15 | 380 |

Thus, while there have been described what are presently believed to be the preferred embodiments of the present invention, those skilled in the art will realize that other and further changes and modifications can be made without departing from the spirit of the invention, and it is intended to include all such changes and modifications as come with the true scope of the invention.

What is claimed is:

1. A method for producing a multi-layer heat sealable structure comprising:
   (a) coextruding a substrate layer of a polyolefin and a second material of higher melting point with a second heat-sealable layer selected from the group consisting of ethylene-propylene random copolymer, ethylene-propylene block copolymer, ethylene-propylene butene-1 terpolymer and blends thereof to form a colayered product;
   (b) biaxially orienting the colayered product of step (a) such that said substrate layer becomes white, opaque and cavitated;
   (c) treating the colayered product of step (a) to increase surface energy of said second layer;
   (d) applying a primer coating on a surface of said second layer having increased surface energy; and
   (e) applying a heat sealable layer on said primer coating, said heat sealable layer including a vinylidene chloride copolymer containing at least 50% by weight of vinylidene chloride.

2. The method of claim 1 wherein said substrate layer and said second layer are coextruded so that said second layer is from about 2 to about 25% of a total thickness of both of said layers.

3. The method of claim 1 wherein said second layer is coextruded onto two surfaces of said substrate layer so that said second layer is from about 4 to about 50% of the total thickness of said substrate layer and said second layer.

4. The method of claim 1 wherein said primer coating applied onto said surface of said second layer as a dispersion.

5. The method of claim 1 wherein said primer coating is applied onto said surface of said second layer as a solution.

6. The method of claim 1 which further comprises recycling back into the substrate layer of step (a), scrap which results from the coextrusion of step (a) so that the substrate layer of step (a) includes up to about 30 percent of reclaimed material blended therein.

* * * * *